US008498108B2

(12) United States Patent
Chen et al.

(10) Patent No.: US 8,498,108 B2
(45) Date of Patent: Jul. 30, 2013

(54) DISK DRIVE ASSEMBLY

(75) Inventors: Yun-Lung Chen, New Taipei (TW);
Da-Long Sun, Wuhan (CN);
Guang-Xiang Mu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 23 days.

(21) Appl. No.: 13/296,537

(22) Filed: Nov. 15, 2011

(65) Prior Publication Data
US 2012/0300389 A1 Nov. 29, 2012

(30) Foreign Application Priority Data
May 26, 2011 (CN) .......................... 2011 1 0138707

(51) Int. Cl.
G06F 1/16 (2006.01)
H05K 5/00 (2006.01)
H05K 7/00 (2006.01)
(52) U.S. Cl.
USPC ................................ 361/679.37; 361/679.33
(58) Field of Classification Search
USPC ........................ 361/679.33–679.39
See application file for complete search history.

(56) References Cited

U.S. PATENT DOCUMENTS

| | | | | |
|---|---|---|---|---|
| 4,979,909 A * | 12/1990 | Andrews | | 439/352 |
| 5,734,557 A * | 3/1998 | McAnally et al. | | 361/727 |
| 5,795,044 A * | 8/1998 | Trewhella et al. | | 312/333 |
| 6,275,377 B1 * | 8/2001 | Liu et al. | | 361/679.31 |
| 6,299,266 B1 * | 10/2001 | Justice et al. | | 312/223.2 |
| 6,313,985 B1 * | 11/2001 | Chen et al. | | 361/679.33 |
| 6,330,147 B1 * | 12/2001 | Adams et al. | | 361/679.37 |
| 6,396,686 B1 * | 5/2002 | Liu et al. | | 361/679.33 |
| 6,535,390 B1 * | 3/2003 | Lo | | 361/726 |
| 6,590,775 B2 * | 7/2003 | Chen | | 361/725 |
| 6,798,653 B2 * | 9/2004 | Chen et al. | | 361/679.33 |
| 7,068,502 B2 * | 6/2006 | Chen et al. | | 361/679.39 |
| 7,327,565 B2 * | 2/2008 | Chen et al. | | 361/679.33 |
| 7,369,403 B2 * | 5/2008 | Chen et al. | | 361/679.33 |
| 7,495,904 B2 * | 2/2009 | Liang et al. | | 361/679.39 |
| 7,580,253 B1 * | 8/2009 | Chen et al. | | 361/679.33 |
| 8,064,208 B2 * | 11/2011 | Chen et al. | | 361/747 |
| 2004/0075978 A1 * | 4/2004 | Chen et al. | | 361/685 |
| 2006/0164803 A1 * | 7/2006 | Chen et al. | | 361/685 |
| 2007/0025068 A1 * | 2/2007 | Chen et al. | | 361/679 |
| 2008/0123280 A1 * | 5/2008 | Chen et al. | | 361/685 |
| 2009/0189042 A1 * | 7/2009 | Chen et al. | | 248/309.1 |
| 2012/0300387 A1 * | 11/2012 | Chen | | 361/679.33 |
| 2012/0300388 A1 * | 11/2012 | Chen | | 361/679.33 |

* cited by examiner

Primary Examiner — Adrian S Wilson
(74) Attorney, Agent, or Firm — Altis Law Group, Inc.

(57) ABSTRACT

A disk drive assembly includes a disk drive and a drive bracket. The disk drive includes a sidewall. The sidewall includes a sidewall body, a first resilient tab extending from the sidewall body, and a second resilient tab extending from the sidewall body. A first securing opening and a second securing opening are defined in the drive bracket. The first securing opening engages the first resilient tab to prevent the disk drive from moving along a first direction. The second securing opening engages the second resilient tab to prevent the disk drive from moving along a second direction opposite to the first direction.

12 Claims, 5 Drawing Sheets

DISK DRIVE ASSEMBLY

CROSS-REFERENCE TO RELATED APPLICATIONS

This application is related to co-pending U.S. patent application Ser. No. entitled "DISK DRIVE ASSEMBLY", Ser. No. 13/325,263.

BACKGROUND

1. Technical Field

The disclosure generally relates to a disk drive assembly.

2. Description of Related Art

Disk drives, such as HDDs (hard disk drives), and CD-ROM (compact disc read-only memory) drives, are usually provided in computers. Brackets may be provided on a front plate of a computer enclosure to receive the drives. Usually, the HDD and the CD-ROM are separately installed in the bracket after a motherboard is installed in the computer enclosure, and large space is needed in the computer enclosure. However, in some thin computer enclosures, the space is so limited that the HDD cannot be installed in the bracket after a motherboard is installed.

Thus, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
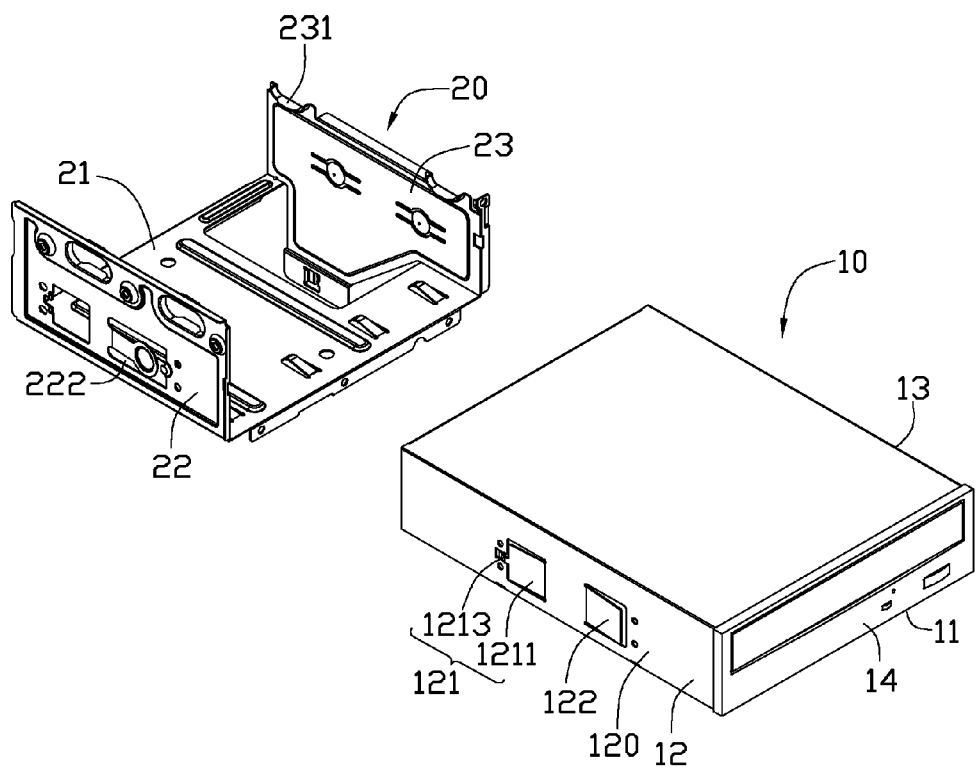
FIG. 1 is an exploded, isometric view of an embodiment of a disk drive assembly.
Figure 2:
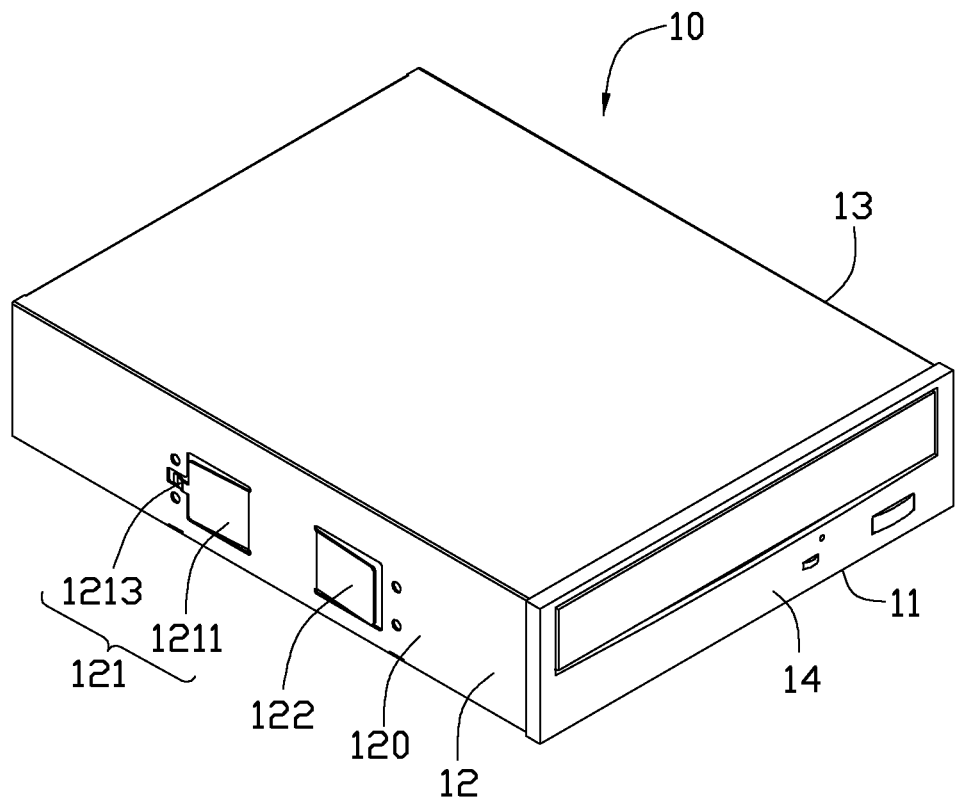
FIG. 2 is an isometric view of a disk drive of FIG. 1.

Referring to FIGS. 1 and 2, a disk drive assembly in accordance with an embodiment includes a disk drive 10 and a drive bracket 20.

The disk drive 10 includes a bottom wall 11, a first sidewall 12 substantially perpendicularly extending from the bottom wall 11, a second sidewall 13 substantially perpendicularly extending from the bottom wall 11, and a front wall 14 connected between the first sidewall 12 and the second sidewall 13. The first sidewall 12 includes a sidewall body 120, a first resilient tab 121 extending outward from the sidewall body 120, and a second resilient tab 122 extending outward from the sidewall body 120. A distance between the first resilient tab 121 and a connecting end of the second resilient tab 122 connected to the sidewall body 120 is less than a distance between the first resilient tab 121 and a free end of the second resilient tab 122. The first resilient tab 121 includes a tab body 1211 and a guiding portion 1213 extending from the tab body 1211. In an embodiment, the guiding portion 1213 is arc-shaped.

Figure 3:
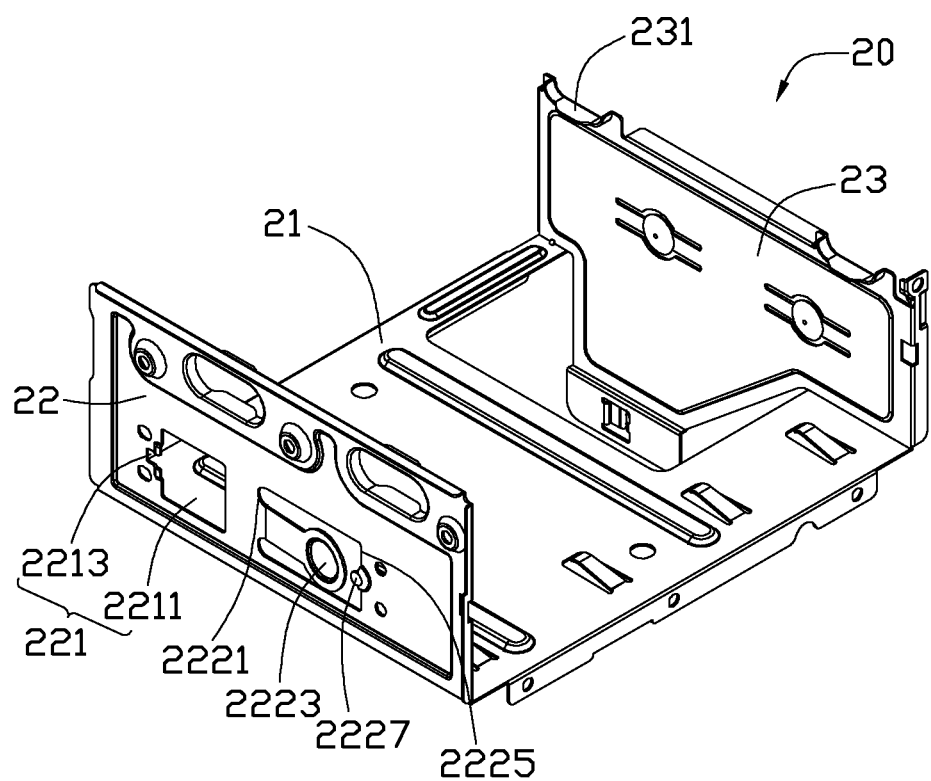
FIG. 3 is an isometric view of a drive bracket of FIG. 1.

Referring to FIGS. 1 and 3, the drive bracket 20 includes a bottom panel 21, a first side panel 22 substantially perpendicularly extending from the bottom panel 21, and a second side panel 23 substantially perpendicularly extending from the bottom panel 21.

A first securing opening 221 and a second securing opening 222 are defined in the first side panel 22. The first securing opening 221 includes a wide part 2211 corresponding to the tab body 1211 of the first resilient tab 121 and a narrow part 2213 communicating with the wide part 2211 and corresponding to the guiding portion 1213 of the first resilient tab 121. The drive bracket 20 further includes a resisting portion 2223 extending from a first edge 2221 of the second securing opening 222. The drive bracket 20 further includes a stopper protrusion 2227 extending from a second edge 2225 of the second securing opening 222. The first edge 2221 is opposite to the second edge 2225.

The bottom panel 21 includes a plurality of contacting tabs for contacting the bottom wall 11. The drive bracket 20 further includes two stopper portions 231 extending from an upper edge of the second side panel 23.

Figure 4:
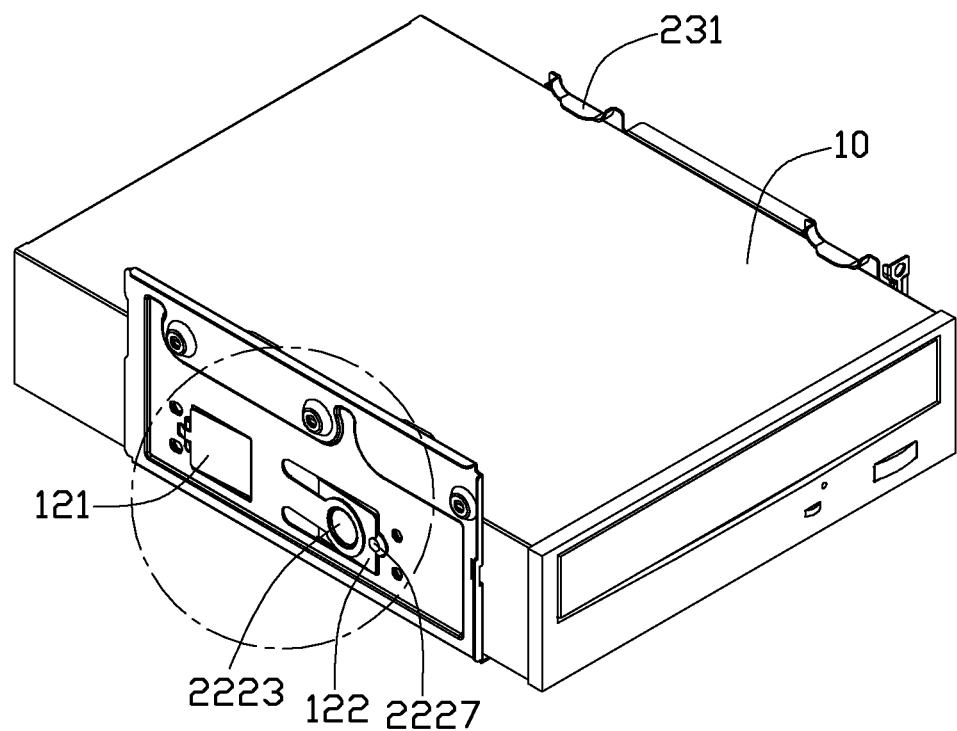
FIG. 4 is an assembled view of the disk drive assembly of FIG. 1.
Figure 5:
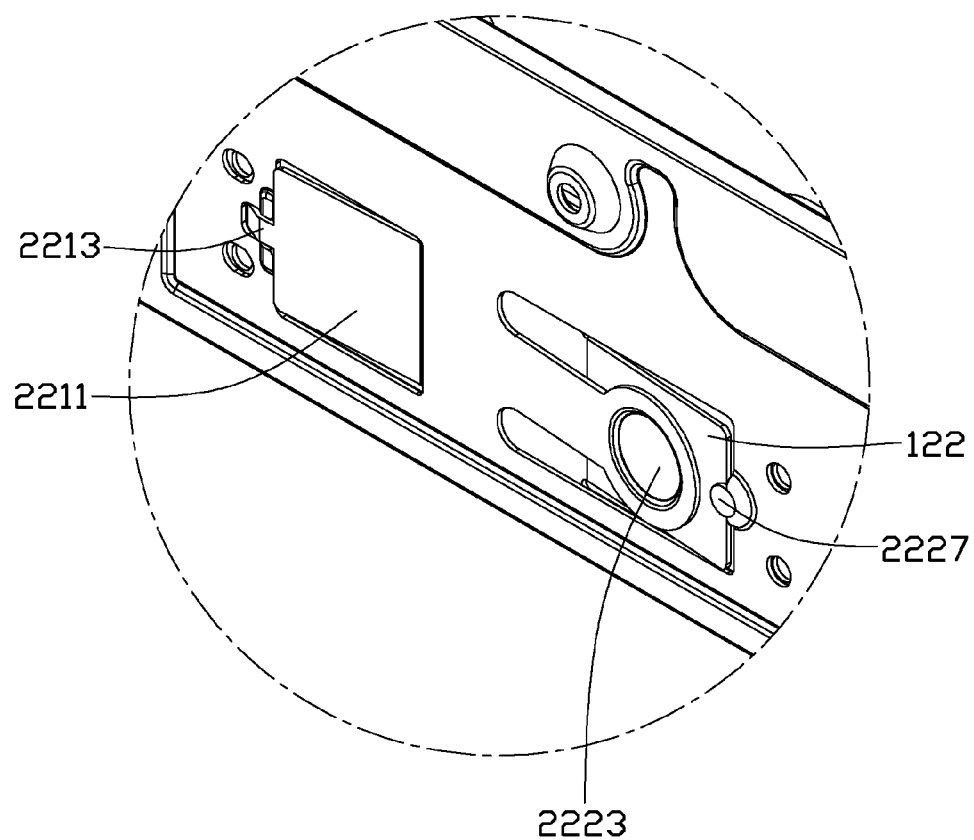
FIG. 5 is an enlarged and partial view of FIG. 4.

Referring to FIGS. 4 and 5, in assembly, the disk drive 10 is aligned with the drive bracket 20. The disk drive 10 is moved to the drive bracket 20 to enable the guiding portion 1213 of the first resilient tab 121 to resist an inner surface of the first side panel 22 of the drive bracket 20. The first resilient tab 121 is deformed resiliently. The bottom wall 11 of the disk drive 10 contacts the contacting tabs of the drive bracket 20. The disk drive 10 is disposed between the stopper portions 231 and the bottom panel 21. The disk drive 10 is pushed inside the drive bracket 20 until the second resilient tab 122 resists the inner surface of the first side panel 22. The disk drive 10 is pushed again to align the first resilient tab 121 with the first securing opening 221 and align the second resilient tab 122 with the second securing opening 222. The first resilient tab 121 and the second resilient tab 122 are released and engage in the first securing opening 221 and the second securing opening 222, respectively. The first resilient tab 121 is engaged in the first securing opening 221 to prevent the disk drive 10 from moving along a first direction. The tab body 1211 and the guiding portion 1213 of the first resilient tab 121 are disposed in the wide part 2211 and the narrow part 2213, respectively. The second resilient tab 122 is engaged in the second securing opening 222 to prevent the disk drive 10 from moving along a second direction opposite to the first direction. The free end of the second resilient tab 122 resists the stopper protrusion 2227 of the drive bracket 20.

In disassembly, the resisting portion 2223 is pressed to resist the second resilient tab 122. The second resilient tab 122 is deformed to move close to the sidewall body 120. The guiding portion 1213 is pressed to deform the first resilient tab 121 towards the sidewall body 120. Then the disk drive 10 is pulled out of the drive bracket 20.

It is to be understood, however, that even though numerous characteristics and advantages have been set forth in the foregoing description of embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A disk drive assembly comprising:
    a disk drive, the disk drive comprising a first sidewall, the first sidewall comprising a sidewall body, a first resilient tab and a second resilient tab, the first and second resilient tabs extending from the sidewall body; and a drive bracket defining a first securing opening and a second securing opening; the first securing opening receiving the first resilient tab to prevent the disk drive from moving along a first direction; and the second securing opening receiving the second resilient tab to prevent the disk drive from moving along a second direction opposite to the first direction;

wherein the first resilient tab comprises a tab body and a guiding portion extending from the tab body; the first securing opening comprises a wide part and a narrow part communicating with the wide part; the tab body is received in the wide part; and the guiding portion is received in the narrow part.

2. The disk drive assembly of claim 1, wherein the second resilient tab comprises a connecting end connected to the sidewall body and a free end; a distance between the first resilient tab and the connecting end is less than a distance between the first resilient tab and the free end.

3. The disk drive assembly of claim 2, wherein the drive bracket comprises a stopper protrusion extending from an edge of the second securing opening, and the free end resists the stopper protrusion.

4. The disk drive assembly of claim 1, wherein the drive bracket comprises a resisting portion extending from an edge of the second securing opening; the resisting portion is adapted to press the second resilient tab to enable the second resilient tab to disengage from the second securing opening.

5. The disk drive assembly of claim 1, wherein the guiding portion is arc-shaped.

6. The disk drive assembly of claim 1, wherein the drive bracket comprises a bottom panel and a first side panel extending from the bottom panel; the first securing opening is defined in the first side panel; and the disk drive is located on the bottom panel.

7. The disk drive assembly of claim 6, wherein the drive bracket further comprises a second side panel extending from the bottom panel; the disk drive is located between the first side panel and the second side panel; the second side panel comprises a stopper portion; and the disk drive is located between the stopper portion and the bottom panel.

8. A disk drive assembly, comprising:

a disk drive, the disk drive comprising a first sidewall, the first sidewall comprising sidewall body, a first resilient tab extending outward from the sidewall body along a first direction, and a second resilient tab extending outward from the sidewall body along a second direction substantially opposite to the first direction; the first resilient tab comprises a first connecting end connected to the sidewall body and a first end; the second resilient tab comprises a second connecting end connected to the sidewall body and a second free end; a distance between the first connecting end and the second connecting end is less than a distance between the first free end and the second free end; and the first connecting end, the second connecting end, and the sidewall body are in the same plane; and a drive bracket, the drive bracket comprising a bottom panel, a first side panel extending from the bottom panel perpendicularly, and a second side panel extending from the bottom panel perpendicularly; the disk drive located on the bottom panel; the first side panel defining a first securing opening and a second securing opening; the first securing opening engaging the first resilient tab to prevent the disk drive from moving in the first direction; the second securing opening engaging the second resilient tab to prevent the disk drive from moving in the second direction; the drive bracket further comprising a stopper portion extending from the second side panel, the disk drive located between the stopper portion and the bottom panel to be prevented from moving in a third direction substantially perpendicular to the bottom panel.

9. The disk drive assembly of claim 8, wherein the drive bracket comprises a stopper protrusion extending from an edge of the second securing opening, and the second free end resists the stopper protrusion.

10. The disk drive assembly of claim 8, wherein the drive bracket comprises a resisting portion extending from an edge of the second securing opening; the resisting portion presses the second resilient tab to enable the second resilient tab to disengage from the second securing opening.

11. The disk drive assembly of claim 8, wherein the first resilient tab comprises a tab body and a guiding portion extending from the tab body; the first securing opening defines a wide part and a narrow part communicating with the wide part; the tab body is received in the wide part; and the guiding portion is received in the narrow part.

12. The disk drive assembly of claim 11, wherein the guiding portion is arc-shaped.

* * * * *